United States Patent
Blattert et al.

(10) Patent No.: US 9,725,077 B2
(45) Date of Patent: Aug. 8, 2017

(54) METHOD FOR PROVIDING A CLAMPING FORCE GENERATED BY AN AUTOMATIC PARKING BRAKE

(71) Applicant: Robert Bosch GmbH, Stuttgart (DE)

(72) Inventors: Dieter Blattert, Kirchheim/Neckar (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 14/615,537

(22) Filed: Feb. 6, 2015

(65) Prior Publication Data
US 2015/0217738 A1 Aug. 6, 2015

(30) Foreign Application Priority Data
Feb. 6, 2014 (DE) .................. 10 2014 202 159

(51) Int. Cl.
| | | |
|---|---|---|
| *B60T 8/17* | (2006.01) | |
| *B60T 7/12* | (2006.01) | |
| *B60T 8/171* | (2006.01) | |
| *F16D 65/18* | (2006.01) | |
| *B60T 13/66* | (2006.01) | |
| *B60T 13/74* | (2006.01) | |
| *B60T 13/58* | (2006.01) | |
| *F16D 121/24* | (2012.01) | |
| *F16D 121/02* | (2012.01) | |

(52) U.S. Cl.
CPC .............. *B60T 8/17* (2013.01); *B60T 7/122* (2013.01); *B60T 8/171* (2013.01); *B60T 13/588* (2013.01); *B60T 13/662* (2013.01); *B60T 13/74* (2013.01); *B60T 13/741* (2013.01); *F16D 65/18* (2013.01); *F16D 2121/02* (2013.01); *F16D 2121/24* (2013.01)

(58) Field of Classification Search
CPC .......... B60T 13/586; B60T 8/17; B60T 8/171; B60T 7/12; B60T 13/588; B60T 13/662; B60T 13/74; B60T 13/741; F16D 65/18; F16D 2121/02; F16D 2121/24
USPC .............. 701/70, 71, 78; 303/3, 15, 16
See application file for complete search history.

(56) References Cited

U.S. PATENT DOCUMENTS

| | | | | |
|---|---|---|---|---|
| 7,744,166 B2 * | 6/2010 | Leiter | ............... | B60T 7/107 |
| | | | | 188/106 P |
| 8,521,388 B2 * | 8/2013 | Baehrle-Miller | ....... | B60T 7/042 |
| | | | | 701/70 |

(Continued)

FOREIGN PATENT DOCUMENTS

| | | | | |
|---|---|---|---|---|
| DE | 10 2011 005 842 A1 | 9/2012 | | |
| DE | 10201105842 A1 * | 9/2012 | ............. | B60T 13/74 |

*Primary Examiner* — Behrang Badii
*Assistant Examiner* — Daniel L Greene
(74) *Attorney, Agent, or Firm* — Maginot, Moore & Beck LLP

(57) ABSTRACT

A method for providing a clamping force generated by an automatic parking brake includes using a brake motor and a brake piston acting on a brake disk to generate the clamping force. The method guarantees a reliable function of the automatic parking brake even on a loss of clamping force due to a temperature change of the brake disk. The method also minimizes the load on components of the automatic parking brake. After a completed application of the automatic parking brake, a secondary application process is carried out as a function of an activation reaction of the brake motor.

9 Claims, 3 Drawing Sheets

(56) References Cited

U.S. PATENT DOCUMENTS

| | | | | |
|---|---|---|---|---|
| 9,068,613 B2* | 6/2015 | Baehrle-Miller | ....... | F16D 65/18 |
| 9,321,439 B2* | 4/2016 | Baehrle-Miller | ....... | B60T 7/107 |
| 9,518,625 B2* | 12/2016 | Putz | ...................... | B60T 13/065 |
| 2004/0017106 A1* | 1/2004 | Aizawa | ...................... | B60T 7/12 |
| | | | | 303/191 |
| 2006/0267402 A1* | 11/2006 | Leiter | ...................... | B60T 7/107 |
| | | | | 303/20 |
| 2007/0084682 A1* | 4/2007 | Griffith | ...................... | B60T 8/00 |
| | | | | 188/156 |
| 2011/0178687 A1* | 7/2011 | Anderson | ............. | B60T 13/745 |
| | | | | 701/70 |
| 2011/0224880 A1* | 9/2011 | Baehrle-Miller | ....... | B60T 7/042 |
| | | | | 701/70 |

* cited by examiner ial application process is carried out as a function of
METHOD FOR PROVIDING A CLAMPING FORCE GENERATED BY AN AUTOMATIC PARKING BRAKE This application claims priority under 35 U.S.C. §119 to patent application no. DE 10 2014 202 159.6, filed on Feb. 6, 2014 in Germany, the disclosure of which is incorporated herein by reference in its entirety.

BACKGROUND

The disclosure relates to a method for providing a clamping force generated by an automatic parking brake, to a controller or regulator, and to an automatic parking brake.

DE 10 2011 005 842 A1 discloses an automatic parking brake for use in a vehicle, which can exert a clamping force on a brake disk in order to immobilize a stationary vehicle. The clamping force is generated by a spindle nut and brake piston which are moved by a brake motor and clamp the brake disk between two brake pads during an application process. The brake piston can also be pressurized with a hydraulic brake fluid, which is achieved using the regular vehicle brake (service brake). Because of braking processes carried out during travel, the brake disk can warm or heat up. This results in the problem, on immobilizing the stationary vehicle with the parking brake, that the coefficient of friction and the expansion of the brake disk change due to the higher temperature. When the brake disk cools after an application of the automatic parking brake, consequently a loss of clamping force of the automatic parking brake can occur. Normally therefore, some time after the application process, a secondary application process is initiated which is calculated and carried out on the basis of information on the brake disk temperature.

If the brake disk temperature determined exceeds a defined value, a not insignificant loss of clamping force of the automatic parking brake is assumed when the brake disk has cooled down after a time period. Then a secondary application process is carried out to compensate for the loss of clamping force. If the brake disk temperature however lies below the predefined temperature value, no secondary application process is carried out because no loss of function is to be expected.

The disadvantage with the conventional method for providing an adequate clamping force is the increasing tendency of many vehicle manufacturers not to use information on brake disk temperature, since this information has many tolerances and therefore is uncertain with reference to an adequate secondary application process.

The object of the present disclosure is therefore to provide a method which guarantees a reliable function of the automatic parking brake even on a loss of clamping force due to a temperature change of the brake disk, and which in addition minimizes the load on components of the automatic parking brake.

SUMMARY

The object is achieved by a method having the features of the disclosure. Refinements of the disclosure are given in the subclaims.

The method according to the disclosure serves to provide a clamping force generated by a parking brake, wherein the clamping force is generated by a brake piston acting on a brake disk and by a brake motor, and wherein after a completed application of the automatic parking brake, a secondary application process is carried out as a function of an activation reaction of the brake motor. Advantageously, the secondary application process is carried out independently of information on the brake disk temperature.

The particular advantage of the disclosure lies in that the method is carried out depending on a reaction of the braking motor to an activation process. Since the reaction of the brake motor to an activation performed again after the end of the application process can be measured very precisely, the method may be carried out without significant uncertainty factors and tolerances. Furthermore the consideration of an activation reaction of the brake motor allows a more accurate decision on whether or not a secondary application process must be carried out. Since, with the method according to the disclosure, it is not the temperature of the brake disk but the reaction of the motor which forms the basis for a secondary application strategy, this can furthermore be carried out with a low load on the components. As a whole, the method according to the disclosure thus ensures a particularly safe provision of a sufficient clamping force, even in the case where a loss of clamping force occurs after the application process due to a temperature change of the brake disk.

Advantageously, the activation reaction of the brake motor is evaluated from a motor rotation following an activation of the brake motor. The motor reaction can be detected in a simple manner by observing the motor rotation during the activation. This reaction can then serve as the basis for a decision on whether or not a secondary application process is required. The rotation of the brake motor is preferably determined by means of pulse counting, in particular by means of a multi-pole wheel in conjunction with a Hall sensor. Alternatively also the electrical resistance of the brake motor can be detected in order to evaluate an activation reaction of the brake motor, and on this basis make a decision on any secondary application process which may be necessary.

A particularly advantageous method is one in which no secondary application process is carried out if the rotation of the brake motor falls below a predefined (threshold) level within a predefined time period since the start of the activation process. Consequently, a motor rotation which falls below a predefined level can be evaluated as an indication that there has been no significant loss of clamping force as a result of a temperature change of the brake disk, and consequently no secondary application process is required. Equally simply, the necessity for a secondary application process can be concluded if the rotation of the brake motor exceeds a predefined threshold motor rotation after a defined time period. In this case a significant loss of clamping force can be concluded, which must be compensated. Following this therefore, advantageously a secondary application process is carried out or hydraulic support requested to support the parking brake.

In a further embodiment of the disclosure, advantageously both when the rotation of the brake motor falls below and when it exceeds a predefined level within a predefined time period, in addition a motor torque, in particular a maximum deliverable motor torque or a resulting maximum generatable clamping force of the brake motor, is taken into account. In this way therefore a further criterion is used for a decision on whether a secondary application process should be carried out, and if so whether this should take place with the hydraulic support of the parking brake. A secondary application process of the parking brake is therefore carried out only if the maximum deliverable torque of the brake motor is sufficient to achieve the required target clamping force. If this is not the case, a hydraulic support of the brakes may be requested.

Accordingly, in the case where the rotation of the brake motor falls below a predefined level within a predefined time period, the maximum deliverable torque or a resulting maximum generatable clamping force of the brake motor is compared with a required or defined output torque, and in the case of insufficient deliverable motor torque, a hydraulic support is requested. For the case where the rotation of the brake motor exceeds a predefined level within a predefined time period, the maximum deliverable motor torque of the brake motor is also compared with the required or defined output torque, and in the case of insufficient deliverable motor torque, a hydraulic support is requested.

Advantageously, in the case where the rotation of the brake motor falls below a predefined level within a predefined time period, the maximum deliverable motor torque or a resulting maximum generatable clamping force is compared with a required or defined (target) output torque, and in the case of sufficient deliverable motor torque, no hydraulic support is requested. In this way it can be ensured that when the motor rotation falls below a predefined level, this is not attributable to a weak motor with insufficient clamping force moment, but that the loss of clamping force is actually not significant.

The method according to the disclosure is performed in a regulator or control unit in a vehicle which may be part of the parking brake.

BRIEF DESCRIPTION OF THE DRAWINGS

Further features and suitabilities of the disclosure arise from the description of exemplary embodiments with reference to the enclosed drawings. The drawings show.

DETAILED DESCRIPTION

Figure 1:
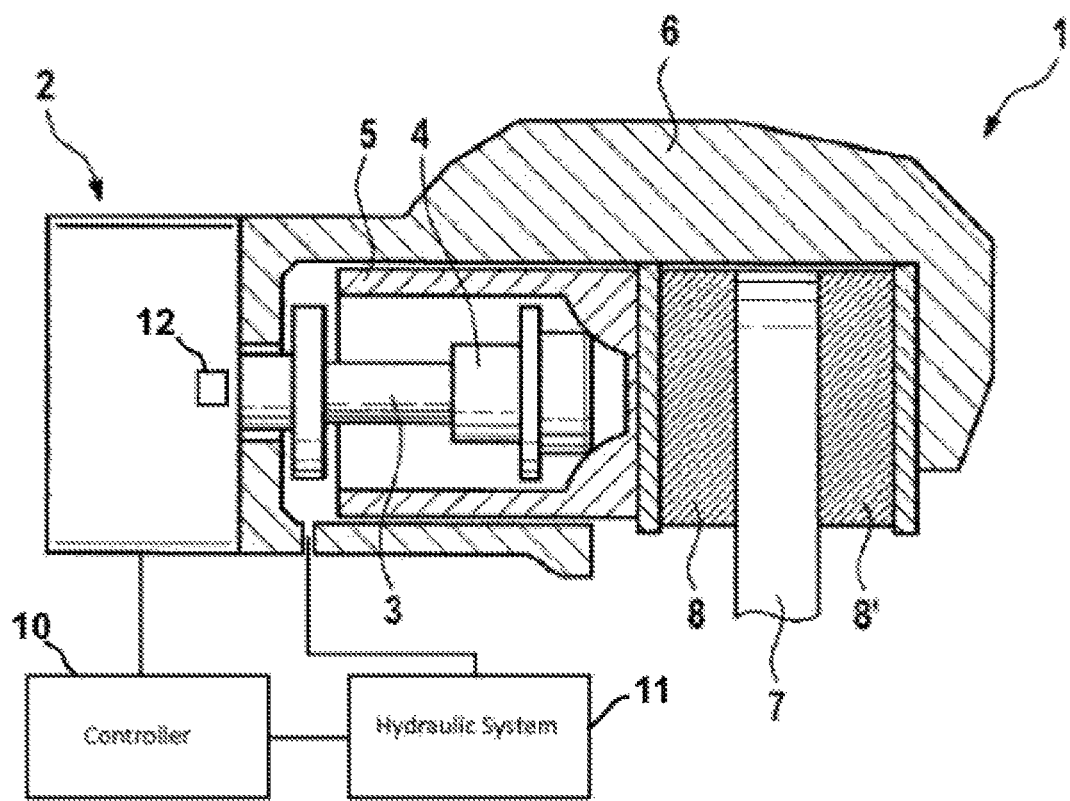
FIG. 1 a section view of a conventional automatic parking brake for a vehicle, with an electric brake motor for generating a clamping force to immobilize the vehicle.

FIG. 1 shows a section through a known automatic (automated) parking brake 1 for a vehicle, which can exert a clamping force by means of a brake motor 2 for immobilizing the vehicle. The brake motor 2 in the present case is formed as an electric motor which drives a spindle 3 mounted in an axial direction, in particular a threaded spindle. On its end away from the brake motor 2, the spindle 3 is fitted with a spindle nut 4 which lies against an inner face or rear of a brake piston 5. The spindle 3, the spindle nut 4 and the brake piston 5 are mounted in a brake caliper 6 which grips a brake disk 7 in the manner of pincers. A brake pad 8, 8' is arranged on either side of the brake disk 7.

In the case of an application of the parking brake 1, the spindle nut 4 is moved in an axial direction towards the brake piston 5 and the brake disk 7 until a predefined target clamping force is achieved. In addition to the electromechanical clamping force, the rear of the brake piston 5 may be pressurized with a hydraulic fluid from the vehicle hydraulic brake system 11, which serves to relieve the load on the automatic parking brake and/or for a braking process in normal drive mode of the vehicle (service brake).

Figure 2:
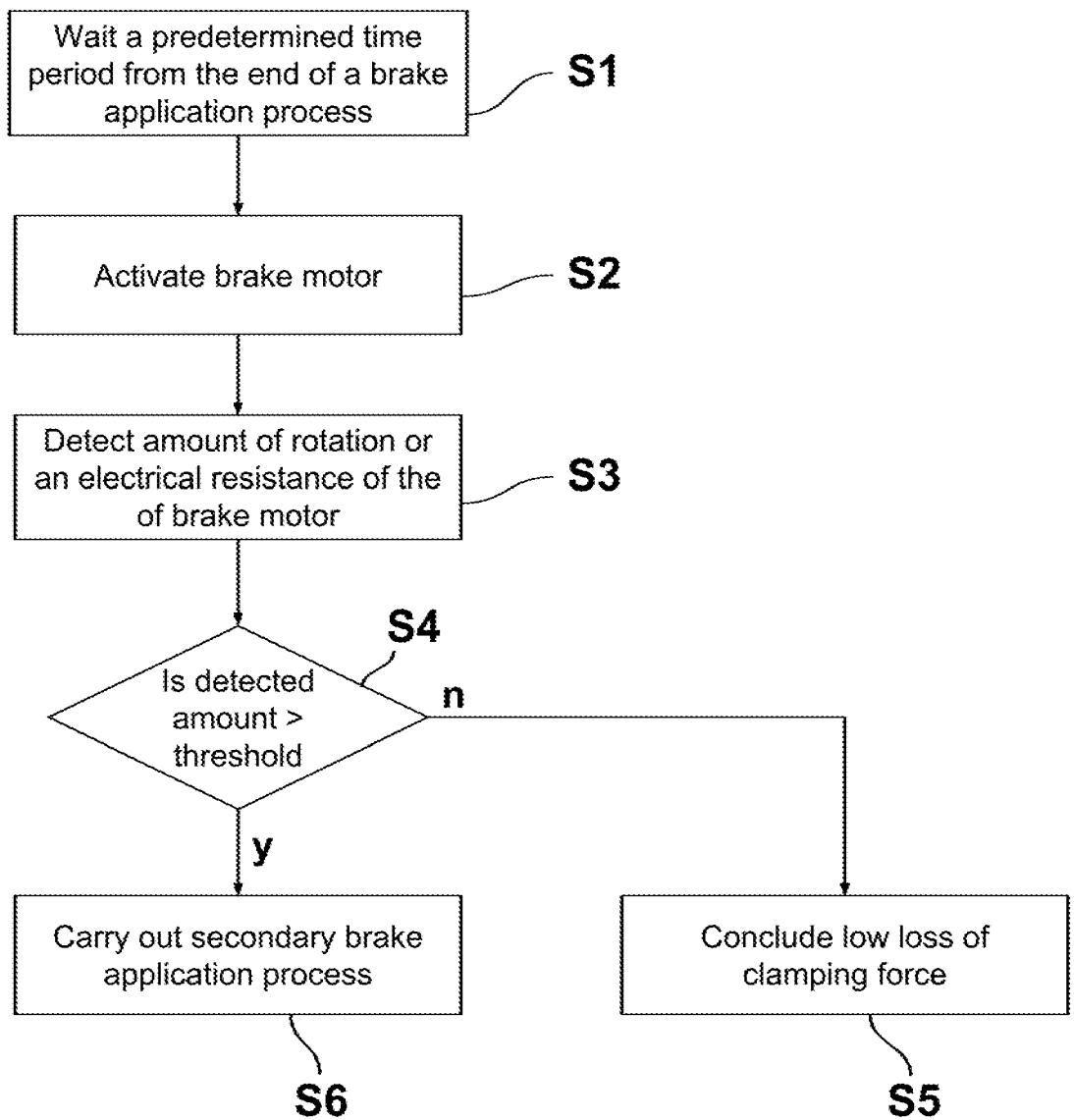
FIG. 2 a flow diagram of a method for providing a clamping force which is generated by an automatic parking brake and immobilizes a vehicle, according to one embodiment of the disclosure.

FIG. 2 shows a flow diagram of a method for providing a clamping force which is generated by an automatic parking brake and immobilizes a vehicle. The method provides for a secondary application strategy with a low load on the components, which guarantees reliable immobilization of the vehicle even in the case of a loss of clamping force. Such a loss of clamping force can also result from internal stresses between the brake motor 2 and the spindle 3, in particular in gear stages, so that after the application process, the brake motor 2 turns back slightly and hence results in a reduction of the output torque of the brake motor 2 (gear loss). Such a loss of clamping force must be compensated with the method according to the disclosure.

To decide whether a not insignificant loss of clamping force has occurred after an application process, in a step S1 after a predefined time period (around 3 to 5 minutes) from the end of an application process, the brake motor 2 is activated in a step S2. This means that the brake motor 2 is set in a rotational movement by the supply of a current so that the spindle nut 4 moves axially with the brake piston 5 in the direction of the brake disk 7. This in itself is substantially a secondary application process which should at least compensate for "gear loss".

In a following step S3, then a motor rotation is measured which has taken place since the start of the motor activation for a predefined time period of for example 20 ms. The motor rotation or electrical resistance of the brake motor is detected using one or more sensors 12 associated with the brake motor 2. In one embodiment, the sensor system comprises a multi-pole wheel on the brake motor 2 in conjunction with a Hall sensor which detects rotation using a pulse counting method. The multi-pole wheel may for example be a pole wheel with 16 alternating magnetic fields per revolution, which allows measurement of the angular speed of the brake motor 2 using the (Hall) sensor.

In a further step S4, the number of pulses determined in the predefined period is compared with a threshold value of a predefined motor rotation, where this preferably comprises a specific number of pulses. If the comparison in step S4 shows that the number of pulses detected in the predefined time period is less than the predefined (threshold) motor rotation, the secondary application process or activation of the brake motor 2 ends in step S5 because a low loss of clamping force can be concluded from the low number of pulses measured.

If however the comparison in step S4 shows that the number of pulses detected in the predefined period is greater than the predefined minimum motor rotation, the secondary application process or activation of the brake motor 2 is continued in step S6 in that a secondary application process is initiated, and in particular a hydraulic support for the automatic parking brake 1 is requested from the brake hydraulic system 11, since a significant loss of clamping power can be concluded from the high number of pulses detected. Due to the hydraulic support, the load on the brake motor 2 is then relieved and no further application process is required. The hydraulic support is preferably generated by a fluid pressure provided by the electronic stability program (ESP) implemented in the brake control system. Thanks to the hydraulic support, the brake motor 2 can turn with low torque. When, after the start of hydraulic support, a defined secondary application travel of for example 0.15 mm is passed, the hydraulic support of the brake motor 2 and its activation are ended and the secondary application process is completed.

As a whole, the method according to the disclosure therefore allows a careful and efficient assessment of whether or not a secondary application process is required. Instead of temperature information, a reaction of the brake motor 2 to an activation process is detected and evaluated. In concrete terms, in the present case the rotation(s) of the brake motor 2 is(are) detected using a pulse counter which concludes a loss of clamping force after an application process. Alternatively, a temporally changing electrical resistance of the brake motor 2 can lead to a conclusion on a loss of clamping force.

Figure 3:
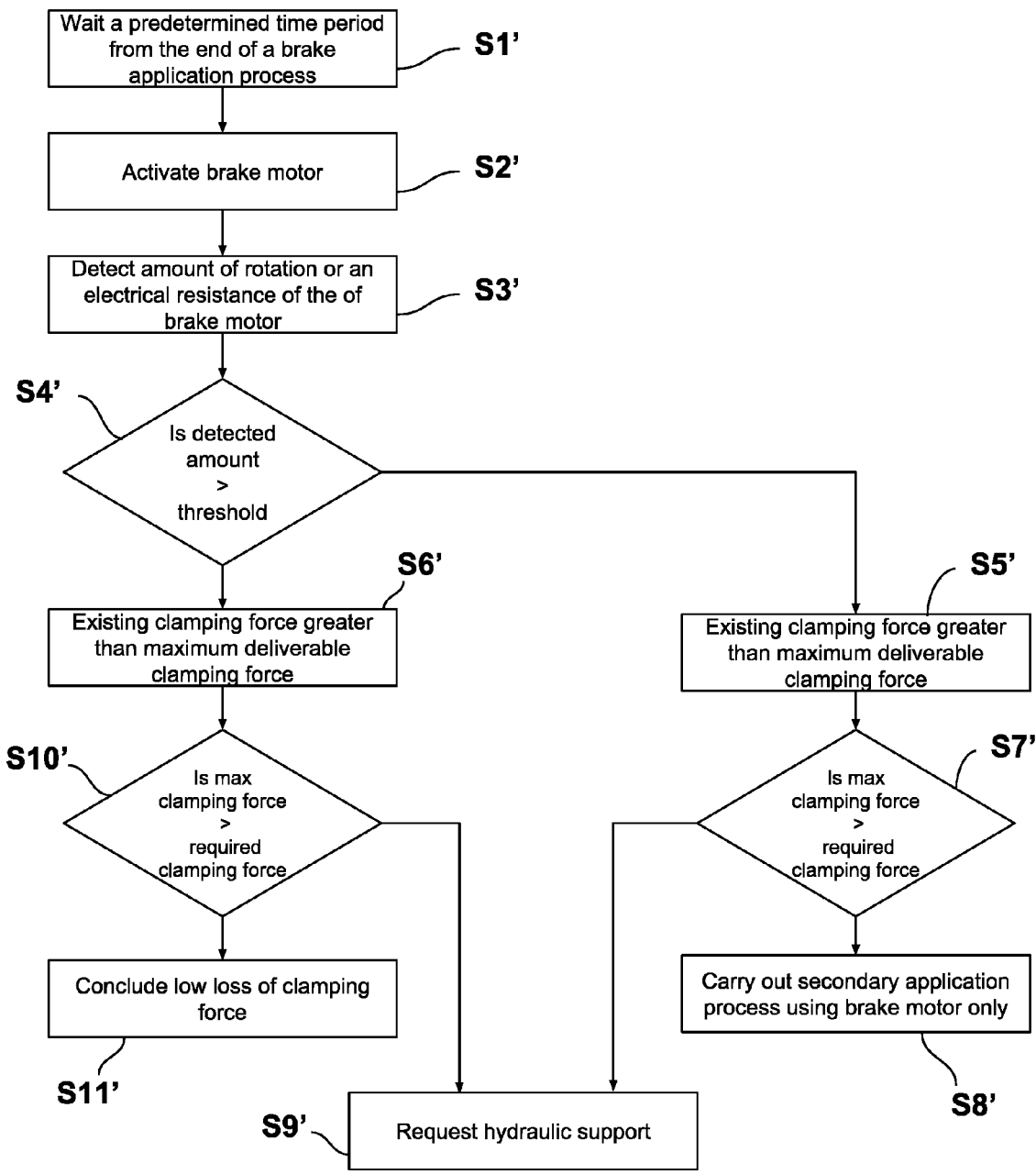
FIG. 3 a flow diagram of a further method for providing a clamping force which is generated by an automatic parking brake and immobilizes a vehicle, according to a further embodiment of the disclosure.

In a further embodiment of the disclosure, advantageously in addition to the motor rotation of the brake motor 2, the motor power is determined and a possible secondary application process initiated on the basis of this motor power. A flow diagram of a corresponding method is shown in FIG. 3.

To be able to determine the present motor power, in this embodiment of the disclosure, the motor parameters of the last usage, in particular the last application process, of the automatic parking brake 1 are taken into account. On each application process, the essential motor parameters such as the motor constant k and the motor resistance R (including the supply line resistance) are determined. Since the secondary application process takes place within around 3 to 5 minutes after the application process, and therefore relatively close in time, it is assumed that the motor parameters have not changed substantially in this period. If however the motor parameters have changed, an increase in the output torque of the brake motor 2 due to cooling of the components of the automatic parking brake 1 is rather assumed here.

The blocking moment of the brake motor 2 can be described with the following equation:

$$M_B = k \cdot I \cdot M_L$$

Here k is the motor constant, I the current consumption of the brake motor 2 and $M_L$ the idling moment. The idling moment $M_L$ reduces the total moment because it is required in order to overcome the internal friction of the brake motor 2 and consequently operate this in an outwardly load-free state. However the current consumption of the brake motor 2 after the activation is not known in the above equation. The current is therefore estimated using Ohm's law and the actual measured on-board network voltage, and the motor resistance known from the last usage, as $I_{max} = U/R$. The maximum output moment $M_{B\_max}$ of the brake motor 2 can then be formulated as follows:

$$M_{B\_max} = k \cdot I_{max} - M_L$$

The maximum generatable mechanical clamping force of the automatic parking brake 1 on the brake disk 7 can be calculated from this as follows:

$$F_{clamp\_max} = \frac{M_{B\_max} \cdot \eta_{total}}{r_{spindle} / \ddot{u}_{total}}$$

Here $M_{B\_max}$ is the maximum output moment of the brake motor 2, $\eta_{total}$ is the total efficiency of the automatic parking brake 1, $r_{spindle}$ is radius, spindle radius, and $\ddot{u}_{total}$ is the total translation ratio of the automatic parking brake 1. Using the known motor parameters therefore, the maximum clamping force which can be generated by the brake motor 2 can be calculated.

In the further embodiment of the disclosure according to FIG. 3, this information is used to make a more accurate decision on the necessity and type of secondary application process. In this embodiment, an activation of the brake motor 2 is initiated after a predefined time period from the end of an application process (S1' and S2').

As in the first exemplary embodiment according to FIG. 2, the motor rotation is determined using a pulse count (S3'). In step S4' it is then determined whether an existing clamping force exceeds a maximum deliverable clamping force $F_{clamp\-max}$ of the brake motor 2. In the subsequent process, again according to step S3 in FIG. 2 a comparison is made between a pulse count measured in a predefined time period and a predefined threshold pulse count (predefined threshold motor rotation). The existing (real) clamping force is then smaller than the maximum deliverable clamping force $F_{clamp\-max}$ of the brake motor 2 if the number of pulses measured is greater than the predefined minimum motor rotation, and the method is continued in step S5'. If the number of pulses however does not exceed the predefined minimum motor rotation, the existing clamping force is greater than the maximum deliverable clamping force $F_{clamp\-max}$ of the brake motor 2 and the method is continued in step S6'.

If therefore a corresponding motor rotation takes place after activation, in step S4' the possibility of providing an additional electromotive clamping force is established. In a subsequent step S7', it is checked whether the maximum deliverable clamping force $F_{clamp\-max}$ of the brake motor 2 is greater than the necessary target clamping force for a secure secondary application of the automatic parking brake 1. In this step is therefore decided whether the brake motor 2 alone can supply the necessary moment, or whether a hydraulic support must be requested. If the maximum deliverable clamping force $F_{clamp\-max}$ is not sufficient, then in step S9' a hydraulic support is requested. If the maximum deliverable clamping force $F_{clamp\-max}$ is however sufficient, in step S8' a secondary application process is carried out exclusively using the clamping force of the brake motor 2.

If the number of pulses does not exceed a predefined minimum motor rotation but is less than this, the existing clamping force is—as stated—greater than the maximum deliverable clamping force $F_{clamp\-max}$ of the brake motor 2, and the method is continued in step S10'. In step S10' it is checked whether the lack of an additional supply of clamping force may be attributed to a "weak" brake motor 2 with a low generatable clamping force, or whether the brake motor 2 is indeed "strong" enough, but there is no significant loss of clamping force and the number of pulses is therefore below the predefined (threshold) motor rotation.

Therefore in step S10' it is queried whether the maximum deliverable clamping force $F_{clamp\-max}$ of the brake motor 2 is greater than the necessary target clamping force. If the maximum deliverable clamping force $F_{clamp\-max}$ of the brake motor 2 is greater than the necessary target clamping force, the method ends in step S11'. If the maximum deliverable clamping force $F_{clamp\-max}$ of the brake motor 2 is however smaller than the necessary target clamping force, in step S9' hydraulic support is requested because a "weak" brake motor 2 is concluded, the maximum deliverable torque of which is not sufficient to exceed the predefined motor rotation.

As a whole, with the additional consideration of the motor power, it can be determined whether a low pulse count within a predefined time period is actually attributable to a slight loss of clamping force and not to a weak motor. Furthermore in the case where the predefined motor rotation is exceeded, it is checked whether the brake motor 2 can itself provide the necessary target clamping force or whether hydraulic support is required.

To this extent the present method is particularly safe for components of the automatic parking brake 1, since the brake motor 2 only carries out a secondary application process if it is actually necessary and if the clamping force of the brake motor 2 is actually sufficient for this. Otherwise the load on the brake motor 2 is limited in that hydraulic support is provided for the automatic parking brake 1.

A decision on whether or not a secondary application process should be carried out, and the decision on whether the clamping force of the brake motor 2 is sufficient for this, may therefore advantageously be made reliably using the method according to the disclosure, without any information on brake disk temperature, exclusively by consideration of an activation reaction of the brake motor 2 and where applicable an additional consideration of the maximum deliverable motor power. As a whole, the present disclosure therefore guarantees a high security of the parking brake function, while at the same time the load on the components is minimized.

The present disclosure may be applied in conjunction with all conventional automatic parking brakes. It may for example be a so-called "motor-on-caliper" parking brake which was described in connection with FIG. 1. Secondly the method may also be applied on other types of automated parking brake, for example of the "cable puller" type in which a motor-gear unit tensions mechanical cables. The method is consequently applicable universally, and in various types of parking brake; it ensures a safe and targeted provision of a clamping force without relying on information on the brake disk temperature. The method can easily be implemented in the form of an algorithm in a controller or regulator, and consequently requires no additional mechanical components.

What is claimed is:

1. A method for providing a clamping force generated by an automatic parking brake, comprising:
   activating a brake motor to move a brake piston toward a brake disk to generate the clamping force a first time; and
   after a first predetermined time period has elapsed after the first application process has been completed, activating the brake motor to move the brake piston toward the brake disk a second time;
   detecting an amount of rotation or electrical resistance of the brake motor over a second predetermined time period, the amount of rotation or electrical resistance detected being indicative of losses in clamping force;
   after the second predetermined time period has elapsed, carrying out a secondary application process as a function of the detected amount of rotation or electrical resistance of the brake motor over the second predetermined time period,
   wherein the secondary application process is carried out independently of information on a temperature of the brake disk temperature.

2. The method according to claim 1, wherein no secondary application process is carried out if the detected amount of rotation or electrical resistance of the brake motor falls below a predefined level.

3. The method according to claim 1, wherein the amount of rotation of the brake motor is detected, and wherein, if the detected amount of rotation exceeds a predefined level, the secondary application process is initiated with hydraulic support for the automatic parking brake.

4. The method according to claim 1, wherein both when the detected amount of rotation or electrical resistance of the brake motor falls below and when the detected amount of rotation or electrical resistance of the brake motor exceeds a predefined level, a maximum deliverable motor torque of the brake motor is taken into account in determining whether the secondary application process should be carried out.

5. The method according to claim 4, wherein, in the case where the detected amount of rotation or electrical resistance of the brake motor falls below a predefined level, the maximum deliverable motor torque of the brake motor is compared with a defined output torque, and wherein, in the case of insufficient deliverable motor torque, a hydraulic support is requested.

6. The method according to claim 4, wherein, in the case where the detected amount of rotation or electrical resistance of the brake motor exceeds a predefined level, the maximum deliverable motor torque of the brake motor is compared with a defined output torque, and wherein, in the case of insufficient deliverable motor torque, a hydraulic support is requested.

7. The method according to claim 4, wherein, in the case where the detected amount of rotation or electrical resistance of the brake motor falls below a predefined level, the maximum deliverable motor torque is compared with a defined output torque, and wherein, in the case of sufficient deliverable motor torque, no hydraulic support is requested.

8. One of a regulator or a control unit for performance of a method for providing a clamping force generated by an automatic parking brake, the method comprising:
   activating a brake motor to move a brake piston toward a brake disk to generate the clamping force a first time; and
   after a first predetermined time period has elapsed after the first application process has been completed, activating the brake motor again to move the brake piston toward the brake disk a second time for a second predetermined time period;
   detecting an amount of rotation or electrical resistance of the brake motor over a second predetermined time period, the amount of rotation or electrical resistance detected being indicative of losses in clamping force;
   carrying out a secondary application process as a function of the detected amount of rotation of the brake motor over the second predetermined time period,
   wherein the secondary application process is carried out independently of information on the brake disk temperature.

9. An automatic parking brake in a vehicle with a regulator or a control unit, the regulator or the control unit configured to perform a method for providing a clamping force generated by the automatic parking brake, the method comprising:
   activating a brake motor to move a brake piston toward a brake disk to generate; and
   after a first predetermined time period has elapsed after the first application process has been completed, activating the brake motor again to move the brake piston toward the brake disk a second time for a second predetermined time period;
   detecting an amount of rotation or electrical resistance of the brake motor over a second predetermined time period, the amount of rotation or electrical resistance detected being indicative of losses in clamping force;

carrying out a secondary application process as a function of the detected amount of rotation of the brake motor over the second predetermined time period, wherein the secondary application process is carried out independently of information on the brake disk temperature.

* * * * *